United States Patent
Kuroiwa et al.

(10) Patent No.: US 6,757,129 B2
(45) Date of Patent: Jun. 29, 2004

(54) MAGNETIC DISK STORAGE APPARATUS

(75) Inventors: Hiroshi Kuroiwa, Maebashi (JP); Yasuhiko Kokami, Takasaki (JP)

(73) Assignees: Renesas Technology Corporation, Tokyo (JP); Hitachi Ulsi Systems Co., Ltd., Tokyo (JP)

( * ) Notice: Subject to any disclaimer, the term of this patent is extended or adjusted under 35 U.S.C. 154(b) by 325 days.

(21) Appl. No.: 10/081,536

(22) Filed: Feb. 25, 2002

(65) Prior Publication Data

US 2002/0181141 A1 Dec. 5, 2002

(30) Foreign Application Priority Data

May 30, 2001 (JP) .......................................... 2001-161766
Dec. 12, 2001 (JP) .......................................... 2001-378352

(51) Int. Cl.$^7$ .......................... G11B 5/596; G05B 11/28
(52) U.S. Cl. ................................. 360/78.04; 360/77.02; 360/61; 318/599; 318/590
(58) Field of Search ........................... 360/78.04, 78.05, 360/78.06, 78.11, 78.14, 77.02, 77.07, 77.08, 75, 61; 318/811, 439, 459, 560, 599, 590, 597, 432, 592, 593; 388/811, 819, 800

(56) References Cited

U.S. PATENT DOCUMENTS 5,986,426 A * 11/1999 Rowan ........................ 318/599
6,084,378 A    7/2000 Carobolante ................ 318/811
6,501,609 B2 * 12/2002 Saito et al. ................... 360/61

* cited by examiner

*Primary Examiner*—Andrew L. Sniezek
(74) *Attorney, Agent, or Firm*—Reed Smith LLP; Stanley P. Fisher, Esq.; Juan Carlos A. Marquez, Esq.

(57) ABSTRACT

In a magnetic disk storage apparatus, when a drive current of the voice coil motor is small, the head drive control circuit executes the linear drive mode under which the voice coil motor is driven in a linear control manner, whereas when the drive current is large, the head drive control circuit executes the pulse drive mode under which the voice coil motor is driven in a pulse width control manner. Both modes are carried out by employing a commonly-used output amplifier that is arranged as a push-pull type output circuit made of both a push-driving output transistor and a pull-driving output transistor. An operation mode of this output amplifier is set to an AB-class operation during the linear drive mode, whereas the operation mode of this output amplifier is set to a B-class operation during the pulse drive mode.

11 Claims, 8 Drawing Sheets

MAGNETIC DISK STORAGE APPARATUS

BACKGROUND OF THE INVENTION

1. Field of the Invention

The present invention generally relates to a control technique of a magnetic disk storage apparatus. More specifically, the present invention is directed to a control technique of a voice coil motor capable of moving a magnetic head for reading/writing information with respect to a storage track formed on a magnetic storage disk to be rotatably driven.

2. Description of the Related Art

A magnetic disk storage apparatus is provided with a magnetic head, a voice coil motor, and a voice coil motor drive control circuit. The magnetic head reads/writes information with respect to storage tracks formed on a magnetic storage disk which is rotatably driven in a high speed. The voice coil motor moves this magnetic head on the magnetic storage disk in both a seek move manner and a tracking move manner. The voice coil motor drive control circuit controls a drive current of the voice coil motor, while monitoring a read condition of the magnetic head, in order to perform a positioning operation of the magnetic head.

While information storage density of magnetic disk storage apparatus is increased year after year, highly precise positioning control operations of magnetic heads are required in connection with this high storage density requirement. Under such a circumstance, the positioning system of the magnetic head has been employed in which the drive current of the above-described voice coil motor is feedback-controlled based upon the detected value of this drive current. Then, generally speaking, in order to drive the voice coil motor for moving this magnetic head, such a liner drive system has been employed in which the drive current amount of the voice coil motor is changed in the continuous manner.

The above-described conventional techniques own the below-mentioned problems which could be revealed by the Inventors of the present invention.

That is, in a magnetic disk storage apparatus, high density storage operation is required and also, highspeed across operation is required. In order to realize such highspeed access operation, time during which a magnetic head is moved to a predetermined storage track of a magnetic disk, namely, so-called "seek time" should be shortened. To reduce the seek time, a drive current of a voice coil motor should be increased. However, when the drive current of the voice coil motor is increased, power loss required to control this motor drive current in the linear manner is increased, resulting in an increase of a heat generation amount. This heat generation occurred during the seek operation may give adverse influences to operations and characteristics of the magnetic head and the magnetic storage disk. As a result, for instance, there is such a problem that read/write errors may be easily produced.

To reduce the above-explained heat generation, the Inventors of the present invention have studied that the above-described drive current of the voice coil motor is controlled in the pulse width modulation control manner (will be referred to as a "PWM control" hereinafter). In other words, the Inventors of the present invention have investigated such a pulse drive system. That is, while the drive current amount of the voice coil motor is not continuously changed, a ratio of turn-ON time to turn-OFF time of this drive current (namely, so-called "duty ratio") is changed to execute the drive control of the voice coil motor. In this case, the drive control operation of the voice coil motor is carried out in such a manner that while the drive current amount of the voice coil motor is fixed to a value approximated to the maximum value, this ratio of the turn-ON to the turn-OFF of the drive current is changed. This drive system corresponds to one sort of switching control operation, and can achieve a very large effect as to the reduction of the power loss.

However, although this pulse drive system can have a merit as to the suppression of the heat generation amount by reducing the power loss, this pulse drive system can hardly realize high control precision, as compared with that of the above-explained linear drive system. In particular, this pulse drive system can hardly secure sufficiently high positioning precision of the magnetic head during the tracking operation in which the move amount of the magnetic head is small.

Under such a circumstance, the Inventors of the present invention has considered that when the large drive current of the voice coil motor is required so as to move the magnetic head in the seek mode and in highspeeds, the drive operation by the PWM control manner (namely, pulse drive mode) is carried out, whereas when the high precision drive control is required so as to perform the tracking control while the amplitude of the drive current is small, the drive operation by the linear control (namely, linear drive mode) is carried out. In this case, when the pulse drive operation and the linear drive operation are carried out by separately employing output amplifiers, the arrangement of the magnetic disk storage apparatus becomes complex and is manufactured in a large scale. In particular, the switching operation between the voice coil motor and the output amplifiers becomes very complex and very cumbersome. In order that the arrangement is not made complex, or in the large scale, the following manner is rational, namely, both the pulse drive operation and the linear drive operation may be commonly executed by the same output circuit.

In other words, the output amplifier which supplies the drive current to the voice coil motor is commonly used during both the pulse drive operation and the linear drive operation. To this end, the output amplifier is arranged in such a manner that the input of this output amplifier is used to switch the pulse drive mode and the linear drive mode in response to a magnitude of a control amount. When the pulse drive operation is carried out, the PWM-controlled pulse signal is entered to the output amplifier. In this case, this PWM-controlled pulse signal owns a sufficiently large amplitude in such a manner that the output amplifier may be fully operated over the dynamic range thereof. As a consequence, while the output amplifier is operated over the full dynamic range under which the output signal of this output amplifier becomes saturated, this output amplifier may supply the pulse drive current to the voice coil motor.

When the linear drive operation is carried out, since such an input signal whose level is changed in a linear mode in response to a change contained in control amounts is entered into the above-explained output amplifier, the voice coil motor is driven in the linear drive mode. In this case, this input signal corresponds to such a signal having a small amplitude which can be fully stored within the dynamic range of the output amplifier. More specifically, when the tracking operation is carried out during which the position of the magnetic head is controlled in the very precise manner, the output amplifier supplies a drive current to the voice coil motor under such a condition approximated to a zero level output.

As explained above, the output amplifier may be commonly used during both the pulse drive operation and the linear drive operation. As a consequence, while the construction of the magnetic disk storage apparatus is not made complex and in the large scale, the voice coil motor can be driven in accordance with such a drive system (namely, either pulse drive system or linear drive system) which is suitably selected during either the seek operation or the tracking operation.

However, it can be recognized that the above-described hybrid drive system of the pulse/linear drive modes own the following problems.

That is, in order that the PWM drive operation is effectively carried out, such an output amplifier operable with a large amplitude and in a high slew rate is necessarily required. In the pulse drive system, the electric power loss can be reduced by controlling the drive current in the high speed by way of the switching control manner. However, when the slew rate is low, the power loss (switching loss) occurred during the switching control operation is increased, so that the merits achieved by this pulse drive system are deteriorated. Although such an excessively high slew rate may probably increase the occurrence of EMI noise, a higher slew rate than a predetermined slew rate is required so as to achieve the originally achieved merits of the pulse drive system.

To drive a voice coil motor, such an amplifier should be used, while this amplifier is operable with both a source output for pushing out a current and a sink output for pulling a current. As an amplifier capable of performing such an output operation, a so-called "push-pull type output circuit" is used. In this push-pull type output circuit, an output element used to control a current pushing amount (either source or push current) is series-connected to another output element used to control a current pulling amount (either sink or pull current), namely a longitudinal connection. A push-pull type output circuit is constructed in such a manner that a push-driving (source) output transistor is series-connected to a pull-driving (sink) output transistor between a positive side and a negative side of a power supply, and an output signal is derived from an intermediate connection point (node) of these transistors.

In the above-described push-pull type output amplifier, a pass-through current (penetration current) problem may occur, while this pass-through current passes through a push-sided transistor to a pull-sided transistor. When this pass-through current is increased, useless power consumption which does not contribute the output signal is increased. Also, when an excessively large pass-through current flows from the push-side transistor to the pull-side transistor, the output transistor may be destroyed. As a result, it is desirable that the pass-through current should be made small as being permitted as possible. In such an output amplifier operated in a B-class mode, since such a operation condition is set, this pass-through current may be interrupted, or cut off, while any one of a push-sided transistor and a pull-sided transistor should be brought into an OFF state in this operation condition.

However, on the other hand, in order to achieve a better linear characteristic, such a passthrough current having a certain value should be supplied. In a B-class amplifier, in the vicinity of an output zero point, namely a so-called "zero-cross point", a so-termed "switching noise" may be produced when one of both a push-sided transistor and a pull-sided transistor is switched from an ON state into an OFF state, and also the other transistor is switched from an OFF state into an ON state. In the case that a voice coil motor is driven in a linear drive mode, the switching noise produced in the vicinity of the output zero point may deteriorate both control precision and stable characteristics of tracking control operation which is carried out in the vicinity of this output zero point.

As previously explained, on the other hand, in such a case that the voice coil motor is driven in the pulse drive mode, such an output amplifier having a large amplitude and operable in a high slew rate is required. However, in such an output amplifier operable in a high slew rate, a pass-through current very easily flows. More specifically, in such an output amplifier operated over a full range in a switching mode, when both a push-sided transistor and a pull-sided transistor are simultaneously brought into ON states even in very short time, an extremely large pass-through current will flow at an instance when both the push/pull transistors are turned ON at the same time. In the worst case, these push/pull transistors and/or a power supply may be brought into break-down conditions. Even when such a break-down condition does not occur, large transition noise which may cause EMI noise is produced. Since this pass-through current may cause such a problem that power consumption is increased even when the voice coil motor is driven in the linear drive mode, it is preferable to avoid that this pass-through current becomes excessively large.

As previously explained, it is desirable to drive the voice coil motor with the large amplitude and in the high slew rate in the pulse drive operation. However, there is such a contradictory aspect that when this slew rate becomes excessively high, EMI noise is increased. On the other hand, when the slew rate is low, there is another problem that power consumption caused by switching loss is increased. Also, in the case that the voice coil motor is driven in the pulse drive mode, even if a control current is slightly deviated, then a pass-through current may flow through the output transistor. As a result, a care should be taken into such an aspect that the power consumption is increased by this pass-through current.

As to other aspects, since a large current may flow through an output transistor, such an electronic element having a large size is employed, as compared with a size of an internal electronic element. Also, an externally-mounted electronic element may be employed as the output transistor. As explained above, when the size ratio of the output transistor to the internal electronic element is large, a difference between the characteristics of these electronic elements due to manufacturing fluctuations is increased. In particular, in such a case that an externally-mounted electronic element is employed, since a manufacturing process of this externally-mounted electronic element is different from that of the internal electronic element, a difference between the characteristic of this externally-mounted electronic element and the characteristic of the internal electronic element which drives this externally-mounted electronic element is further increased.

As a consequence, in such a case that the above-described idling current is supplied in order to improve the linear characteristic of the output current during the linear drive operation, the following problems may occur. That is, the fluctuation of this idling current is increased due to this difference between the characteristics of these electronic elements. Thus, the power consumption becomes excessively larger than the expected power consumption, so that heat generations are increased. Although the power consumption is small, the switching noise is increased. As a result, such an optimum operation cannot be achieved, while this optimum operation is required so as to drive the voice coil motor in the high precision manner.

As previously described, the following fact can be revealed. That is, in the magnetic disk storage apparatus, the hybrid drive system may expect such a large merit as to the power consumption and the control precision, but may cause the above-explained various contradictory problems in such a case that both the pulse drive operation and the linear drive operation are commonly carried out by employing the same output amplifier. In this hybrid drive system, the voice coil motor for moving the magnetic head in either the seek mode or the tracking mode is driven by switching the pulse drive operation and the linear drive operation in response to the magnitude of this head drive amount.

SUMMARY OF THE INVENTION

The present invention has been made to solve the above-described problems of the conventional hybrid drive system, and therefore, has an object to provide such a technique capable of driving a voice coil motor by switching a drive mode thereof as either a pulse drive mode or a linear drive mode in response to a magnitude of a drive amount of this voice coil motor which moves a magnetic head in either a seek mode or a tracking mode, and also capable of performing both the pulse drive mode and the linear drive mode under optimum conditions by employing the same output amplifier.

Furthermore, another object of the present invention is to provide such a technique capable of realizing such operations that since the voice coil motor is driven with a high amplitude and in a high slew rate during the pulse drive mode, access operation of the magnetic head can be carried out in a high speed by shortening seek time. Also, this technique can realize such operations that while both an occurrence of EMI noise and a heat generation which may probably induce read/write errors are suppressed to minimum values during the linear drive mode, a positioning control operation of the magnetic head can be carried out in high precision during the tracking operation.

The above-described objects and other objects as well as features of the present invention may be understood from detailed descriptions of the specification and also accompanying drawings.

A typical inventive idea of the present invention selected from the disclosed present inventive ideas will now be briefly explained as follows:

That is, in such a magnetic disk storage apparatus that a magnetic head for reading and/or writing information with respect to storage tracks formed on a magnetic storage disk to be rotatably driven is driven by a voice coil motor, a magnetic head drive control means for executing a positioning control operation of the magnetic head by feedback-controlling a drive current of the magnetic head while monitoring a read condition of the magnetic head is provided with a linear drive mode under which the voice coil motor is driven in a linear control manner, and a pulse drive mode under which the voice coil motor is driven in a pulse width control manner. When a drive current of the voice coil motor is small, the magnetic head drive control means executes the linear drive mode, whereas when a drive current of the voice coil motor is large, the magnetic head drive control means executes the pulse drive mode. Both the linear drive mode and the pulse drive mode are carried out by employing a commonly-used output amplifier. The commonly-used output amplifier is arranged as a push-pull type output circuit made of both a push-driving output transistor and a pull-driving output transistor. Also, an operation mode of this output amplifier is set to an AB-class operation during the linear drive mode, whereas the operation mode of this output amplifier is set to a B-class operation during the pulse drive mode.

In accordance with the above-described magnetic head drive control means, the voice coil motor can be driven by switching the drive mode thereof as either the pulse drive mode or the linear drive mode in response to the magnitude of the drive amount of this voice coil motor which moves the magnetic head in either the seek mode or the tracking mode, and also both the pulse drive mode and the linear drive mode can be carried out under optimum conditions by employing the same output amplifier. As a consequence, the voice coil motor can be driven by using the drive system (pulse/linear drive systems) suitable for the seek operation and the tracking operation, respectively.

Also, in the above-described magnetic disk storage apparatus, even in such a case that the voice coil motor is driven in the low slew rate during the linear drive mode, or in the high slew rate during the pulse drive mode, the voice coil motor used to move the magnetic head in either the seek operation or the tracking operation can be driven in response to the magnitude of this drive amount by switching the pulse drive mode, or the linear drive mode, and furthermore, both the pulse drive operation and the linear drive operation can be carried out by employing the same output amplifier under better conditions.

As a consequence, while the construction of this magnetic disk storage apparatus is not made complex and in a large scale, the seek time is shorten, so that the access operation of the magnetic head can be carried out in high speeds. On the other hand, during the linear drive mode, while both the generation of the EMI noise and the heat generation which may probably induce the read/write errors are suppressed to the minimum values, the magnetic head positioning control operation can be carried out in the high precision during the tracking operation.

DESCRIPTION OF THE EMBODIMENTS

Referring now to drawings, various embodiments of the present invention will be described in detail.

Figure 1:
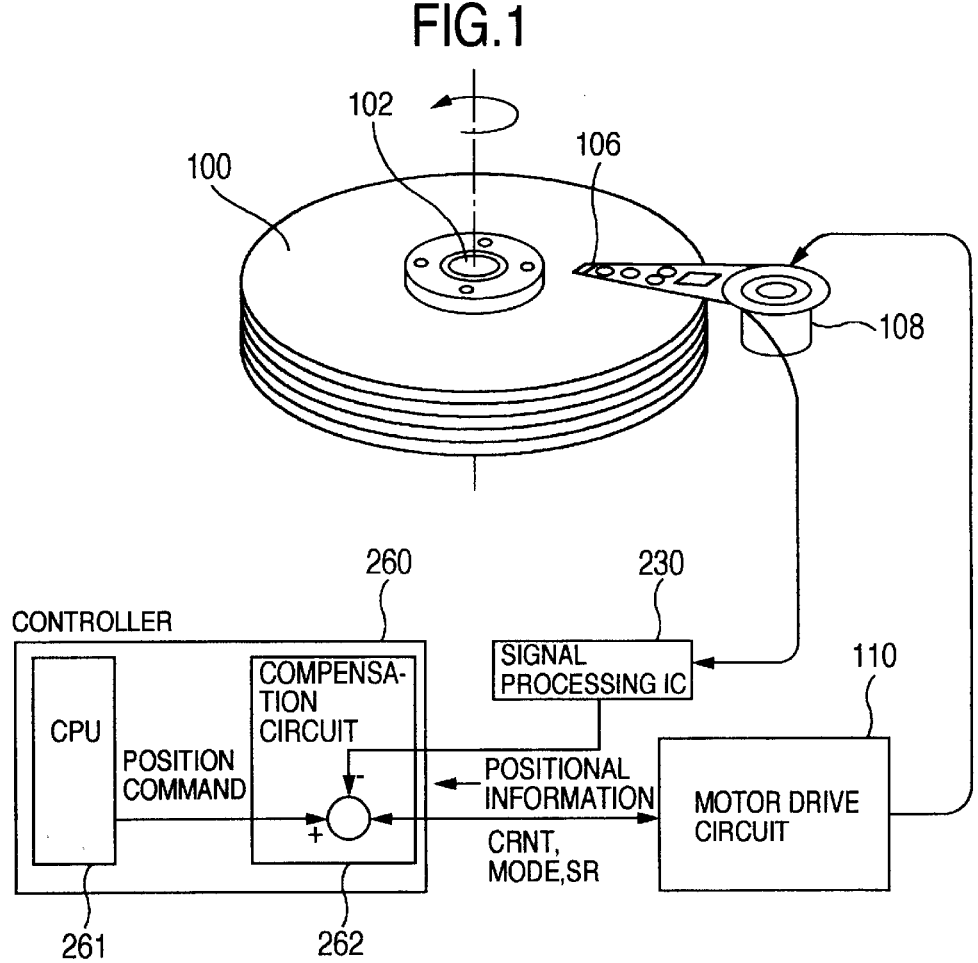
FIG. 1 is block diagram for schematically showing a conceptional structure of a magnetic disk storage apparatus to which the present invention is applied.

FIG. 1 conceptionally shows a magnetic disk storage apparatus to which the inventive idea of the present invention has been applied.

The magnetic disk storage apparatus shown in this drawing contains a magnetic storage disk 100, a spindle motor 102, a magnetic head 106, a voice coil motor 108, a motor drive circuit 110, a signal processing circuit (signal processing IC) 230, and a controller 260, and the like. The spindle motor 102 rotatably drives the magnetic storage disk 100. The magnetic head 106 reads/writes information with respect to storage tracks formed on the magnetic storage disk 100. The voice coil motor 108 moves, or transports this magnetic head 106 on the magnetic storage disk 100 along a radial direction of this disk 100. The motor drive circuit 110 drives the voice coil motor 108. The signal processing circuit: (signal processing IC) 230 reads out positional information from a readout signal of the magnetic head 106. The controller 260 supplies a drive current command (instruction) value CRNT to the motor drive circuit 110 based upon the positional information read out by the signal processing circuit 230.

In this embodiment, the controller 260 contains a microcomputer (CPU) 261, and a compensation circuit 262. The microcomputer 261 controls an overall operation of the magnetic disk storage apparatus. The compensation circuit 262 produces a drive current command value based upon both a positional command (target track positional information) derived from the microcomputer 261 and head positional information derived from the signal processing circuit 230. As previously explained, the drive current command value CRNT produced by this compensation circuit 262 is supplied to the motor drive circuit 110.

Also, in this embodiment, the magnetic disk apparatus is arranged in such a manner that both a mode command (instruction) signal "MODE" and a slew rate setting signal "SR" are produced by the controller 260, and then, are supplied to the motor drive circuit 110. This mode command signal MODE is used to switch a linear drive mode and a PWM drive mode. The slew rate setting signal SR instructs a slew rate in a PWM drive mode.

Figure 2:
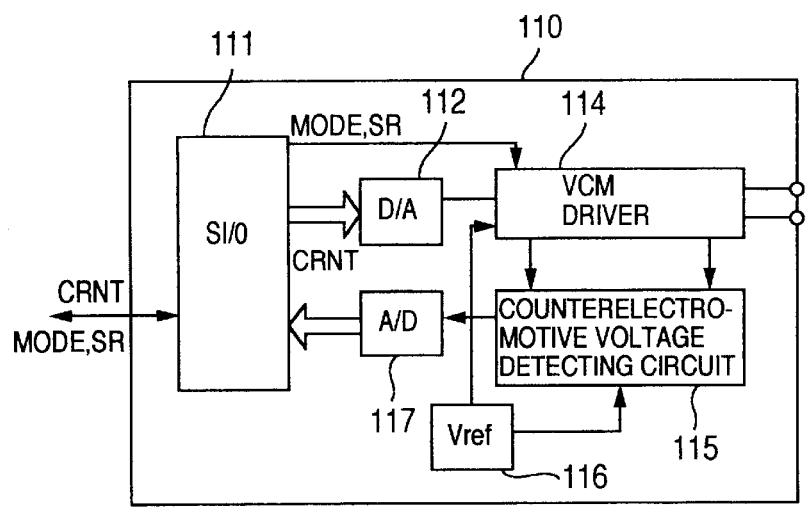
FIG. 2 is a schematic block diagram for representing a structural example of a voice motor drive circuit which constitutes the magnetic disk storage apparatus to which the present invention is applied.

As represented in FIG. 2, the motor drive circuit 110 contains a serial port 111, a D/A converter 112, a VCM driver 114, a counterelectromotive voltage detecting circuit 115, a reference voltage generating circuit 116, and also, an A/D converting circuit 117. The serial port 111 transmits/receives data in a serial manner between the controller 260 and the own motor drive circuit 110. The D/A converter 112 converts the drive current command value CRNT which is transmitted from the controller 260 as the digital data into an analog type drive current command value. The VCM driver 114 supplies a drive current to the voice coil motor 108 based upon this analog type drive current command value. The counterelectromotive detecting circuit 115 detects a counterelectromotive voltage (counterelectromotive force) which is induced in a coil of the voice control motor 108. The reference voltage generating circuit 116 generates a reference voltage "Vref" which is required by both the counterelectromotive voltage detecting circuit 115 and the VCM driver 114. The A/D converting circuit 117 A/D-converts the counterelectromotive voltage detected by the counterelectromotive detecting circuit 115 into digital counterelectromotive voltage data.

The above-described drive current command value CRNT produced by the controller 260 is supplied via the serial port 111 to the D/A converter 112. Also, both the mode command signal MODE and the slew rate setting signal SR are supplied via this serial port 111 to the VCM driver 114. On the other hand, the counterelectromotive voltage which is converted into the digital data by the A/D converting circuit 117 is supplied via the serial port 111 to the controller 260. Then, the controller 260 may recognize a move speed (travel speed) of the magnetic head 108 from the received counterelectromotive voltage.

The controller 260 determines an operation mode in response to a move speed of the magnetic head 108, and then supplies the mode command signal MODE to the motor drive circuit 110 so as to give a command to this motor drive circuit 110. The VCM driver 114 drives the voice coil motor 108 in accordance with the designated operation mode. Concretely speaking, during either the read mode or the write mode in which a move drive amount of the magnetic head 106 is small, such a "linear drive mode" is designated to be executed by the VCM driver 114, while the drive current of the voice coil motor 108 is controlled in the linear control manner in this linear drive mode. Also, during the seek mode in which a move drive amount of the magnetic head 106 is large, such a "pulse drive mode" is designated in which the drive current of the coil of the voice coil motor 108 is controlled in the PWM control manner, and the drive current of the voice coil motor 108 is controlled by the VCM driver 114 in this designated pulse drive mode. The contents of the respective drive modes will be later explained more in detail.

Furthermore, this controller 260 executes a level discrimination as to a magnitude of a drive current value which is instructed by the drive current command value produced by the compensation circuit 262 by using a predetermined threshold value. Then, the controller 260 produces the mode command signal MODE based upon a result of this level discrimination, and then, supplies this mode command signal MODE to the motor drive circuit 110 so as to designate an operation mode. As to this mode command signal MODE, in the case that the drive current command value produced by the compensation circuit 262 is smaller than the predetermined threshold value, the controller 260 instructs the "linear drive mode", whereas in the case that the drive current command value produced by the compensative circuit 262 is larger than, or equal to the predetermined threshold value, the controller 260 instructs the "pulse drive mode". The VCM driver 114 is constructed in such a manner that this VCM driver 114 may switch the drive mode to any one of the "linear drive mode" and the "pulse drive mode" in response to the mode command signal MODE, and then executes the motor control operation in accordance with the switched drive mode.

Since the above-described magnetic head drive system is employed in this magnetic disk storage apparatus, during such a tracking operation under which the move drive amount of the magnetic head 106 is small, the voice coil motor drive current is controlled in the linear manner, so that higher positioning precision can be achieved. On the other hand, during a seek operation under which the move drive amount of the magnetic head 106 is large, the "pulse drive mode" is selected and thus the voice coil motor is driven in this pulse drive mode, so that the magnetic head 106 can be moved, or traveled, while suppressing power loss. As a result, while EMI noise and heat generations which may probably induce read/write errors be effectively reduced, the magnetic disk storage apparatus of the present invention may achieve both the higher control pricision of the magnetic head positioning operation during the tracking operation, and also the highspeed access operation by reducing the seek time.

Figure 3:
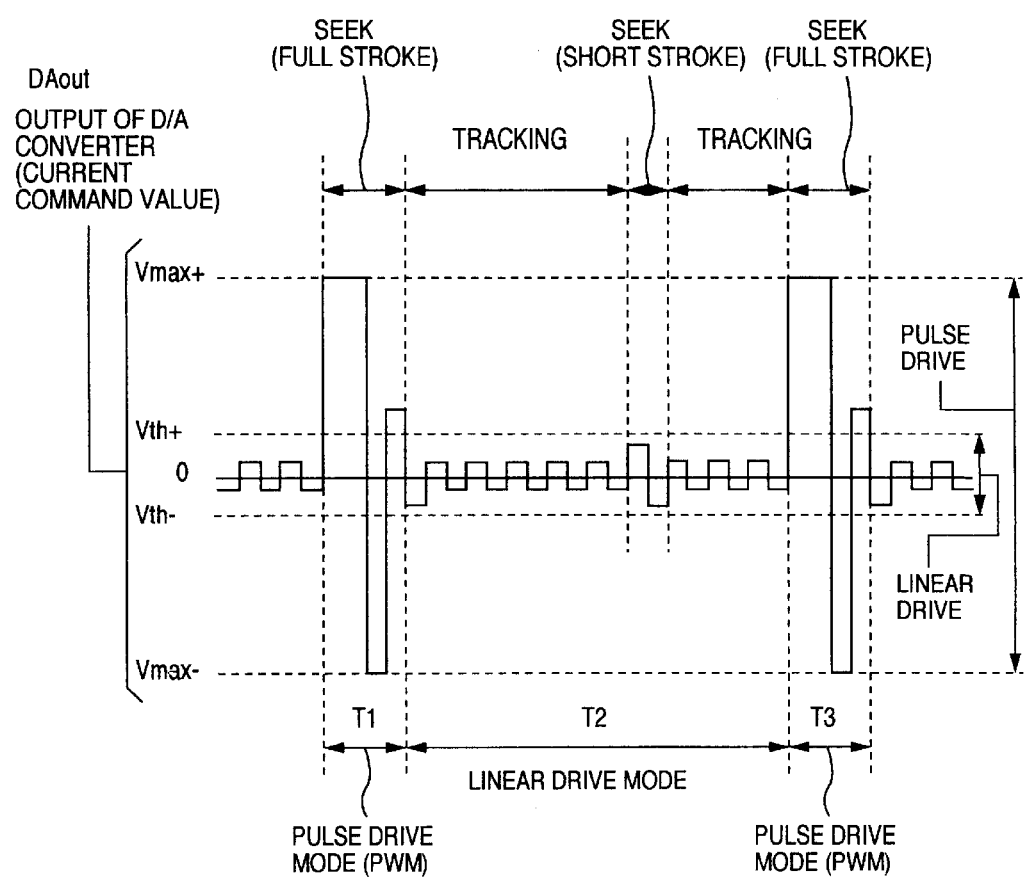
FIG. 3 is a timing chart for illustratively showing a relationship between a current command value of the voice motor drive circuit during seek operation and another current command value of the voice motor drive circuit during tracking operation.

FIG. 3 is a timing chart for showing a relationship between a current command value during the seek operation of the motor drive circuit 110 shown in FIG. 2, and a current command value during the tracking operation thereof.

As indicated in FIG. 3, since a necessary move amount of the magnetic head 106 is large during the seek operation (namely, time period of "T1" shown in FIG. 3), the controller 260 issues a full range of the drive current command value CRNT, namely, a maximum scale (Vmax+/Vmax−) of the drive current command value CRNT in response to this large necessary move amount. This drive current command value is changed into an analog drive current command value (Vmax+/Vmax−) by the D/A converter 112, and then, this analog command value is supplied to the VCM driver 114. Then, the VCM driver 114 executes the pulse drive mode in such a manner that an average drive current of the voice coil motor 108 is made coincident with this analog command value, while the drive current supplied to the voice coil motor 108 is controlled by the PWM control manner in this pulse drive mode. Since the drive current command value is set to "Vmax+", the magnetic head 106 is seek-driven in a high speed. Thereafter, since the drive current command value is set to "Vmax−", the movement of this magnetic head 106 is brought into the braking state.

Then, when the magnetic head 106 is seek-driven to be reached to a target storage track, the necessary move amount of this magnetic head 106 becomes small. In response to this operation, the magnitude of the drive current command value CRNT issued from the controller 260 is decreased, and also the analog drive current command value outputted from the D/A converter 112 becomes smaller than Vmax+. When the magnitude (absolute value) of this drive current command value becomes smaller than a predetermined threshold value (Vth), the drive mode is changed from the pulse drive mode to the linear drive mode. As a result, the VCM driver 114 executes the linear drive mode in such a manner that the drive current of the voice coil motor 108 becomes equal to the above-described command value by the linear control operation, and thus, performs a so-called "tracking operation (namely, time period of T2 shown in FIG. 3) in which the high precision positioning control operation is carried out with respect to the magnetic head 106.

Figure 4:
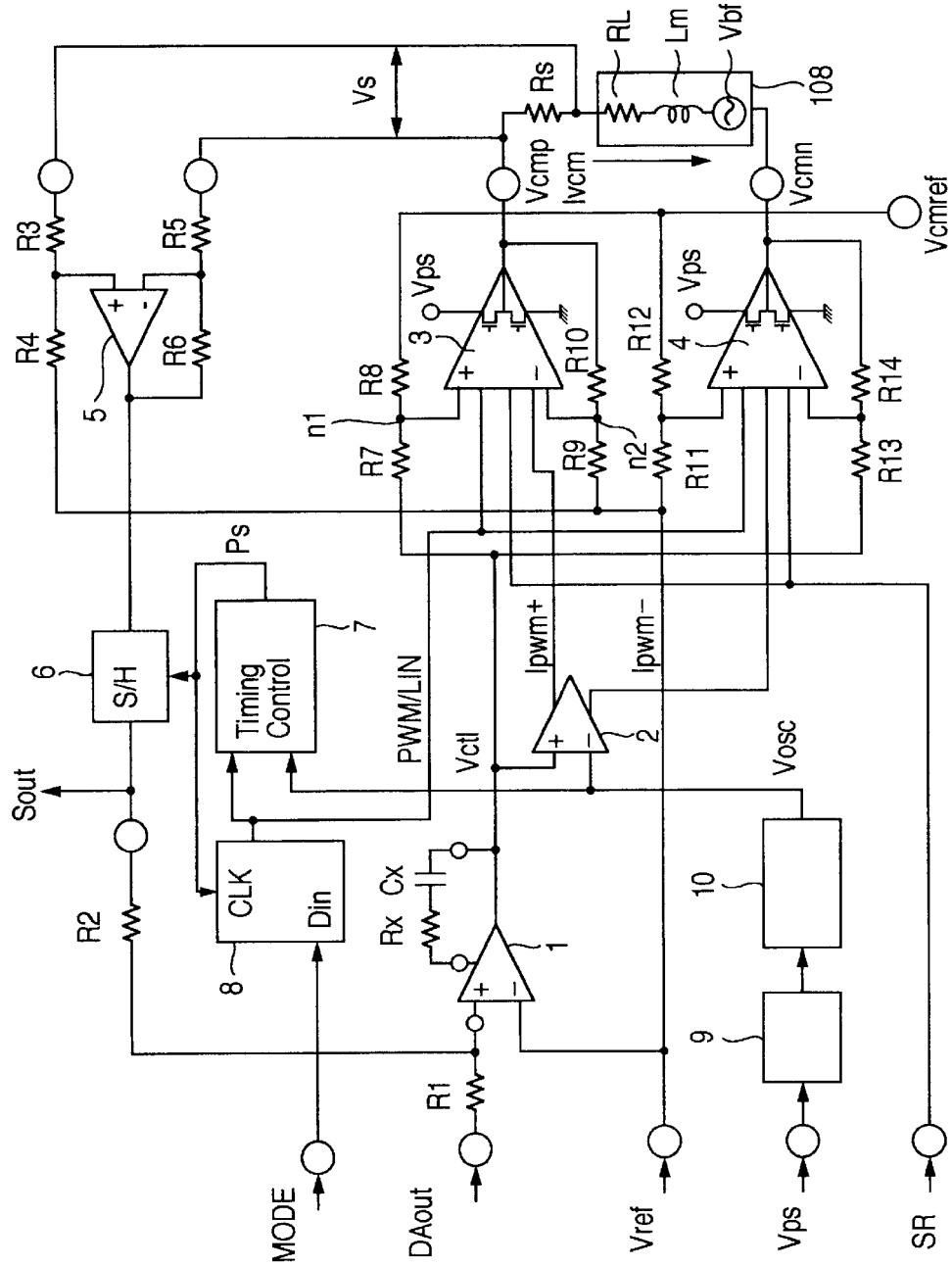
FIG. 4 is a circuit diagram for indicating an embodiment of a VCM driver used in the magnetic disk storage apparatus of the present invention.
Figure 5:
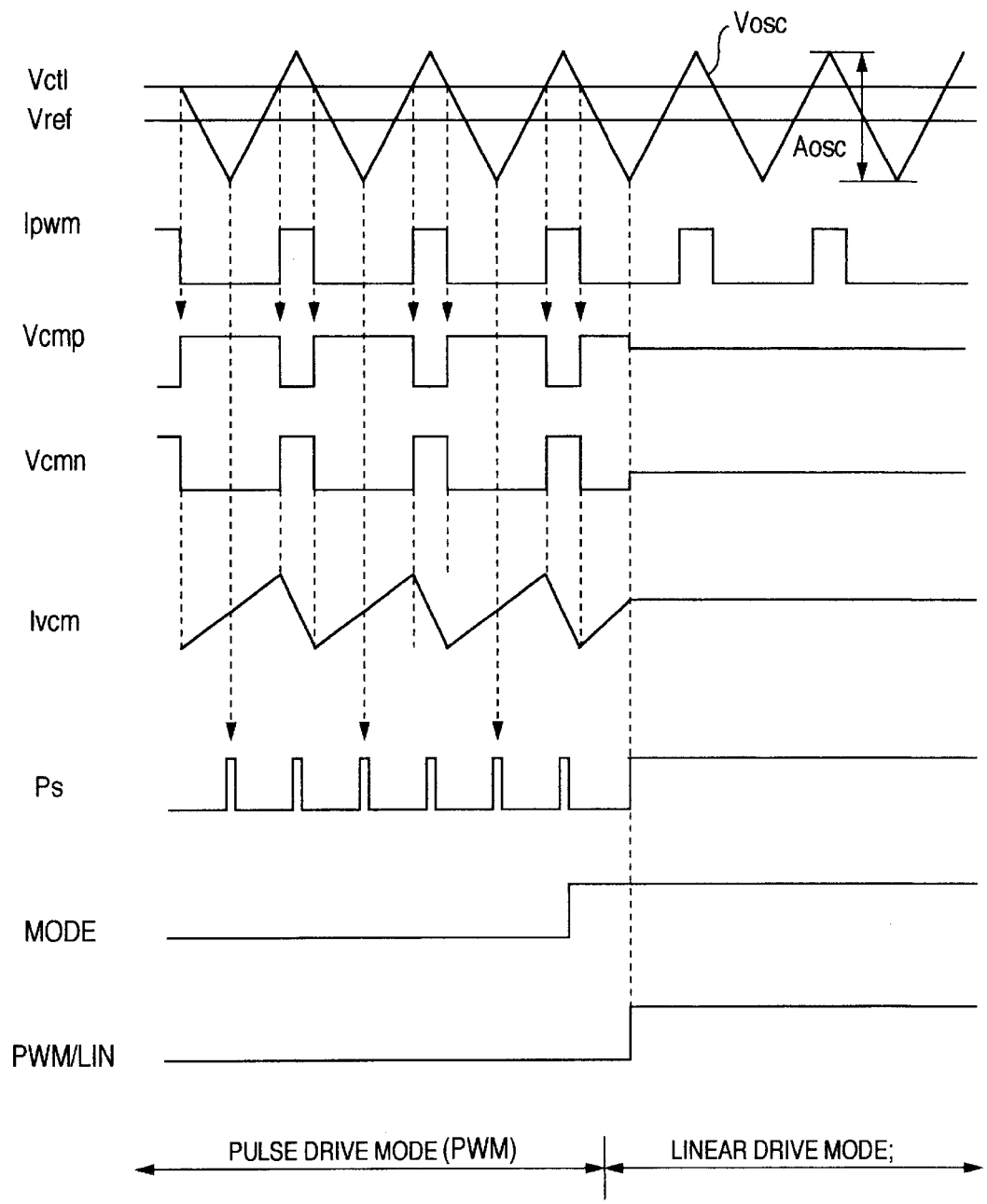
FIG. 5 is a timing chart for representing an example of operations in a major unit of the VCM driver shown in FIG. 4 when the drive mode thereof is changed from "pulse drive mode" to "linear drive mode."

FIG. 4 indicates an embodiment of the above-explained VCM driver 114. Also, FIG. 5 shows an operation timing chart for explaining operations of a major portion of this VCM driver 114 shown in FIG. 4.

As indicated in FIG. 4, the VCM driver 114 is arranged by a control amplifier 1, a PWM comparator 2, output amplifiers 3 and 4, a current sense amplifier 5, a sample and hold circuit 6, a timing control circuit 7, a latch circuit 8, an amplitude control circuit 9, a triangular wave generating circuit 10, and so on. While each of the above-explained amplifier 1, and 3 to 5 is constituted by an operational amplifier circuit having differential input terminals, such a circuit operation characteristic as a gain may becomes a desirable characteristic by optimally determining constants of circuit elements such as resistors R1 to R14 and transistors provided in the amplifier.

Also, in FIG. 4, symbol "DAout" shows such a drive current command value which is supplied from the controller 260 and then, is converted into an analog value by the D/A converter 112, symbol "Vps" indicates a power supply voltage, and symbols "Vref" and "Vcmref" each show operation reference voltages of the circuit. Both a resistor "Rx" and a capacitor "Cx", which are connected to the control amplifier 1, show phase compensating elements, and symbol "Rs" indicates a current detecting resistor for converting a current flowing through the coil into a voltage "Vs." The voice coil motor 108 is indicated as an equivalent circuit by using an inductance "Lm" of the coil, an internal resistance "Rm" thereof, and a counterelectromotive voltage source "Vbf."

The control amplifier 1 amplifies a difference between the drive current command value "DAout" and an output current "Sout" to output the amplified difference as a control voltage (target control voltage) "Vctl." This drive current command value "DAout" is converted into an analog signal by the D/A converter 112 and is entered via the resistor R1. The output current "Sout" is sampled by the sample/hold circuit 6 and then is entered via the resistor R2.

The PWM comparator 2 compares a signal level of a triangular wave signal Vosc outputted from the triangular wave generating circuit 10 with a signal level of the above-described control voltage Vctl so as to produce both a pulse current "Ipwm+" and another pulse current "Ipwm−", the widths of which are changed in response to this control voltage Vctl. In other words, this PWM comparator 2 produces both the pulse current "Ipwm+" and the pulse current "Ipwm−", which are PWM-modulated by the control voltage Vctl.

Both the output amplifiers 3 and 4 correspond to current drivers in which predetermined voltage gains are set by using the resistors R7 to R14, and are driven in response to either the control voltage Vctl or both the pulse currents "Ipwm+" and "Ipwm−." Then, while the coil Lm of the voice coil motor 108 and the sensing resistor Rs are series-connected between the output terminals of the output amplifiers 3 and 4, a drive current "Ivcm" may be supplied to the coil of the voice coil motor 108 by the output amplifiers 3 and 4. As previously explained, the coil of the voice coil motor 108 is driven along a dual direction by using one pair of the output amplifiers 3 and 4. In FIG. 5, symbol "Vcmp" indicates an output voltage of one output amplifier 3, and symbol "Vcmn" shows an output voltage of the other output amplifier 4.

Also, in this embodiment, the above-described voice coil motor drive current Ivcm is converted into a drive current by the current detecting resistor Rs, and then, this converted drive voltage is detected by the sense amplifier 5. This converted voltage Vs (=Rs×Ivcm) is amplified by the current sense amplifier 5 by such a voltage gain set by the resistors R3 to R6, and then, the amplified voltage is entered into the sample/hold circuit 6. The sample/hold circuit 6 samples the above-explained current detection voltage Vs in synchronism with the sampling pulse Ps produced by the timing control circuit 7. The timing control circuit 7 detects peaks (namely, both upper-sided peak and lower-sided peak) of the triangular wave signal Vosc, and produces the above-explained sampling pulse signal "Ps" every this peak detecting point.

The latch circuit 8 latches the mode command signal MODE in synchronism with the above-explained sampling pulse Ps, and then, outputs a mode switching control signal PWM/LIN. When the motor drive circuit of FIG. 4 is brought into such a condition that the "linear drive mode" is designated as the operation mode in response to the mode command signal MODE, the output of the timing control circuit 7 is fixed to a high level in synchronism with a first sampling pulse Ps after this condition. As a result, the sample/hold circuit 6 is set to a continuous sampling state under which the input signal (current detection voltage Vs) may directly pass through this sample/hold circuit 6, so that the sampled output current value is supplied to the control amplifier 1.

On the other hand, when the motor drive circuit is brought into such a state that the "PWM drive mode" is designated as the operation mode by way of the mode command signal MODE, the detection voltage Vs of the drive current which is amplified by the current sense amplifier 5 and flows through the coil is sampled at intermediate timing between an ON state and an OFF state of a voice coil motor drive circuit "Ivcm" in response to the sampling pulse Ps. Since an instantaneous value of the voice coil motor drive current Ivcm becomes an average value at this intermediate timing, this average output current value is sampled to be supplied to the control amplifier 1.

Also, in such a case that the "pulse drive mode" is designated by way of the mode command signal MODE, both the output amplifiers 3 and 4 are operated based upon the pulse currents "Ipwm+" and "Ipwm−" which are outputted from the comparator 2, so that the PWM pulse drive operation of the motor coil is carried out.

It should be noted that the amplitude control circuit 9 performs an amplitude control operation in such a manner that an amplitude Aosc of the above-described triangular wave signal Vosc is directly proportional to the power supply voltage Vps. The drive current Ivcm which is supplied from the output amplifiers 3 and 4 to the voice coil motor 108 is changed by the power supply voltage Vps. As a result, when the output amplifiers 3 and 4 are driven by using a pulse, if the power supply voltage Vps is changed, then a current drive gain with respect to this pulse width is changed. In order to compensate for this gain change, the amplitude control circuit 9 controls the amplitude Aosc of the triangular wave signal Vosc in accordance with the below-mentioned formula:

$Vps/Aosc = R8/R7 = R11/R12 =$ constant.

As previously described, in the case that the drive current of the coil is PWM-controlled, the coil current detection voltage Vs which is amplified by the current sense amplifier 5 is sampled at the intermediate timing between the ON-state and the OFF-state of the voice coil motor drive current Ivcm in response to the sampling pulse Ps which is produced at the peak of the triangular wave signal Vosc. At this intermediate timing, the instantaneous value of the voice coil motor drive current Ivcm becomes the average value. Also, at this intermediate timing, kickback noise caused by the ON/OFF states of the drive current Ivcm does not occur. As a result, the PWM control operation of the coil drive current can be carried out in the correct and safe manners based upon the average value of the voice coil motor drive current Ivcm.

In the case that the drive current of the coil is controlled in the linear drive mode, this linear drive control operation is executed by continuously feeding back the voice coil motor drive current Ivcm via the sample/hold circuit 6 on the input side of the control amplifier 1. The "pulse drive mode" is switched to the "linear drive mode" in synchronism with the above-described sampling pulse Ps. As a consequence, the drive mode switching operation may be carried out in a smooth manner at such a timing when the instantaneous value of the voice coil motor drive current Ivcm becomes an average value of one PWM time period. FIG. 5 indicates such a timing in the case that the operation of the magnetic head is switched from the seek operation by the "pulse drive mode" into the tracking operation by the "linear drive mode."

The pulse drive mode corresponds to such a sampling system that while the time period defined from the average value sampling pulse Ps of the drive current up to the next average value sampling pulse Ps is defined as one time period, the coil drive current is PWM-driven. As a consequence, in the case that the sampling system is designed in such a manner that the voltage gain defined from the output of the control amplifier 1 up to the drive edge of the voice coil motor is made coincident with each other in both the linear drive mode and the PWM drive mode, namely in the case that the loop gain of the system is made coincident with each other, both the output voltage and the drive circuit Ivcm of the control amplifier 1 at the sampling pulse generation point are completely made identical to each other both in the linear/PWM drive modes. As a result, since the switching operation of the drive mode is carried out in synchronization with the current sampling pulse Ps, the output variation occurred in the drive mode switching operation can be reduced to zero in principle.

On the other hand, the magnetic head may be brought into a runaway state due to seek error in the magnetic disk apparatus. This runaway state may be detected by monitoring such a counterelectromotive voltage Vbf appeared at the drive terminal of the voice coil motor 108. In the normal linear drive mode, the above-described counterelectromotive voltage Vbf may be monitored based upon the drive voltage of the voice coil motor 108 and the drive current flowing through the voice coil motor 108. However, in the case of the PWM drive mode, since the kickback noise (EMI noise by Ldi/dt) caused by the coil inductance Lm of the voice coil motor 108 is produced at the drive terminal of the voice coil motor 108, only the counterelectromotive voltage Vbf cannot be directly detected from the drive terminal of this voice coil motor 108.

As previously explained, this problem can be solved in accordance with the following manner. That is, while the sampling pulse Ps is produced at the intermediate timing during which this kickback noise is not produced, both the average drive current is detected in synchronism with this sampling pulse, and also the drive current of the voice coil motor is represented by employing the output voltage Vctl of the control amplifier 1. This output voltage Vctl is equal to the instruction value of the average value output within one PWM time period of the drive voltage of the voice coil motor. In the case of the embodiment indicated in FIG. 4, while such a voltage Vsout on which the above-explained counterelectromotive voltage Vbf is derived from the output Sout of the sample/hold circuit 6, and also, the voltage corresponding to the drive voltage of the voice coil motor is derived from the output Vctl of the control amplifier 1, these derived voltages are applied to the counterelectromotive voltage detecting circuit 115, so that this counterelectromotive voltage Vbf is monitored.

Figure 6:
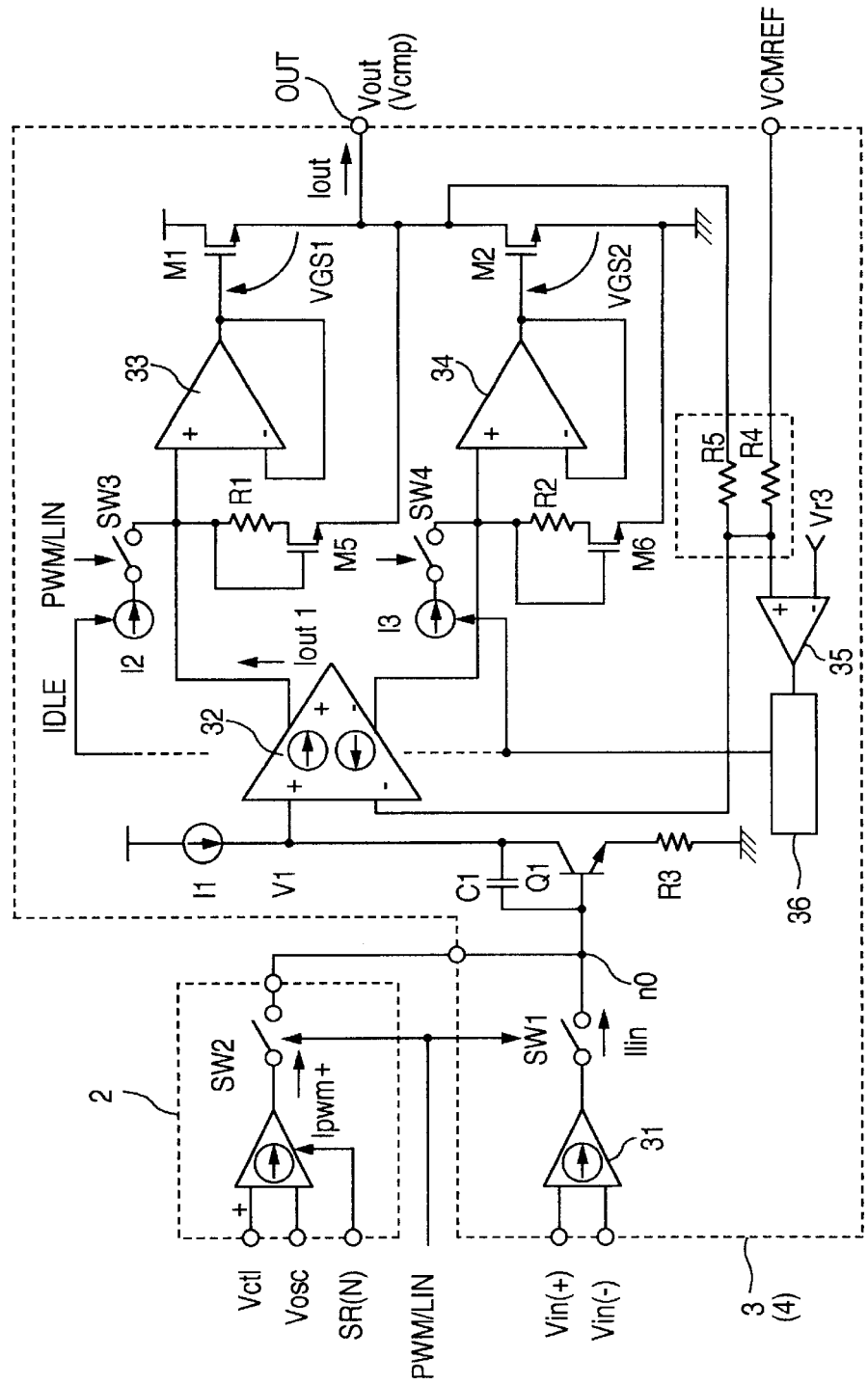
FIG. 6 is a circuit diagram for indicating a concrete circuit example of an output amplifier which constitutes the VCM driver shown in FIG. 4.

FIG. 6 shows a concrete example of the circuit arrangement of the output amplifiers 3 and 4 among the circuits indicated in FIG. 4.

In FIG. 6, reference numeral 2 indicates a PWM comparator which compares the control voltage Vctl outputted from the control amplifier 2 with the triangular wave signal Vosc outputted from the triangular wave generating circuit 10. This PWM comparator 2 is arranged in such a way that an output current IPWM can be changed in a stepwise manner in response to the slew rate control signal SR. Since this output current IPWM is changed in the stepwise manner, an inclination of an output voltage waveform is changed during the PWM drive mode, and thus, the slew rate can be lowered until the EMI noise can be reduced. As a consequence, the optimized slew rate can be set in such a manner that the EMI noise can be effectively reduced, and also the increase of the power loss caused by the switching loss can be avoided.

Also, symbols "M1" and "M2" show output transistors which drive the coil terminals of the voice coil motor 108, respectively, which are constructed of N-channel MOSFETs. These two output transistors M1 and M2 are series-connected between the plus terminal side and the minus terminal side of the power supply, so that these output transistors M1 and M2 constitute an output circuit (final stage) of a push-pull system in which an output (OUT) is derived from an intermediate connection point (node). In this case, one output transistor M1 is operated as a push (source) driving transistor, whereas the other output transistor M2 is operated as a pull driving transistor.

Reference numeral 31 represents an initial-stage amplifier of the output amplifier 3(4). Both a potential of a connection node "n1" between the resistor R7 and the resistor R8 (see FIG. 4), and also another potential of another connection node "n2" between the resistor R9 and the resistor R10 (see FIG. 4) are inputted to both an input terminal Vin(+) and another input terminal Vin(−) of this initial-stage amplifier 31. Then, this initial-stage amplifier 31 outputs a current ILIN in response to a potential difference between these two potentials. Then, a switch SW1 and another switch SW2 are provided on the side of the output of this initial-stage amplifier 31 and on the side of the output of the PWM comparator 2 respectively, while these switches SW1 and SW2 are ON/OFF-controlled in response to a mode switching signal PWM/LIN.

While these switches SW1 and SW2 are mutually ON/OFF-controlled in a complementary manner, any one of the output from the initial-stage amplifier 31 and the output from the PWM comparator 2 is supplied to a node "n0" as an essential input signal of the output amplifier 3(4). In this case, when the switch SW1 is set to the ON state (switch SW2 is set to OFF state) so as to enter thereto the output of the initial-stage amplifier 31, the output amplifier 3(4) is controlled in the linear mode.

Also, when the switch SW2 is set to the ON state (switch SW1 is set to OFF state) so as to enter thereto the output of the PWM computer 2, the output amplifier 3(4) is controlled in the PWM mode.

A base of a bipolar transistor Q1 which constitutes an emitter-grounded type amplifier circuit is connected to the above-described node "n0." An emitter of this bipolar transistor Q1 is connected via the resistor R3 to the ground, and a collector thereof is connected to a constant current source I1, which constitutes a so-called "emitter-grounded type amplifier circuit." Also, a capacitor C1 is connected between the base and the collector of this transistor Q1. This capacitor C1 may be operated as an integration capacitor capable of executing a phase compensation.

Figure 7:
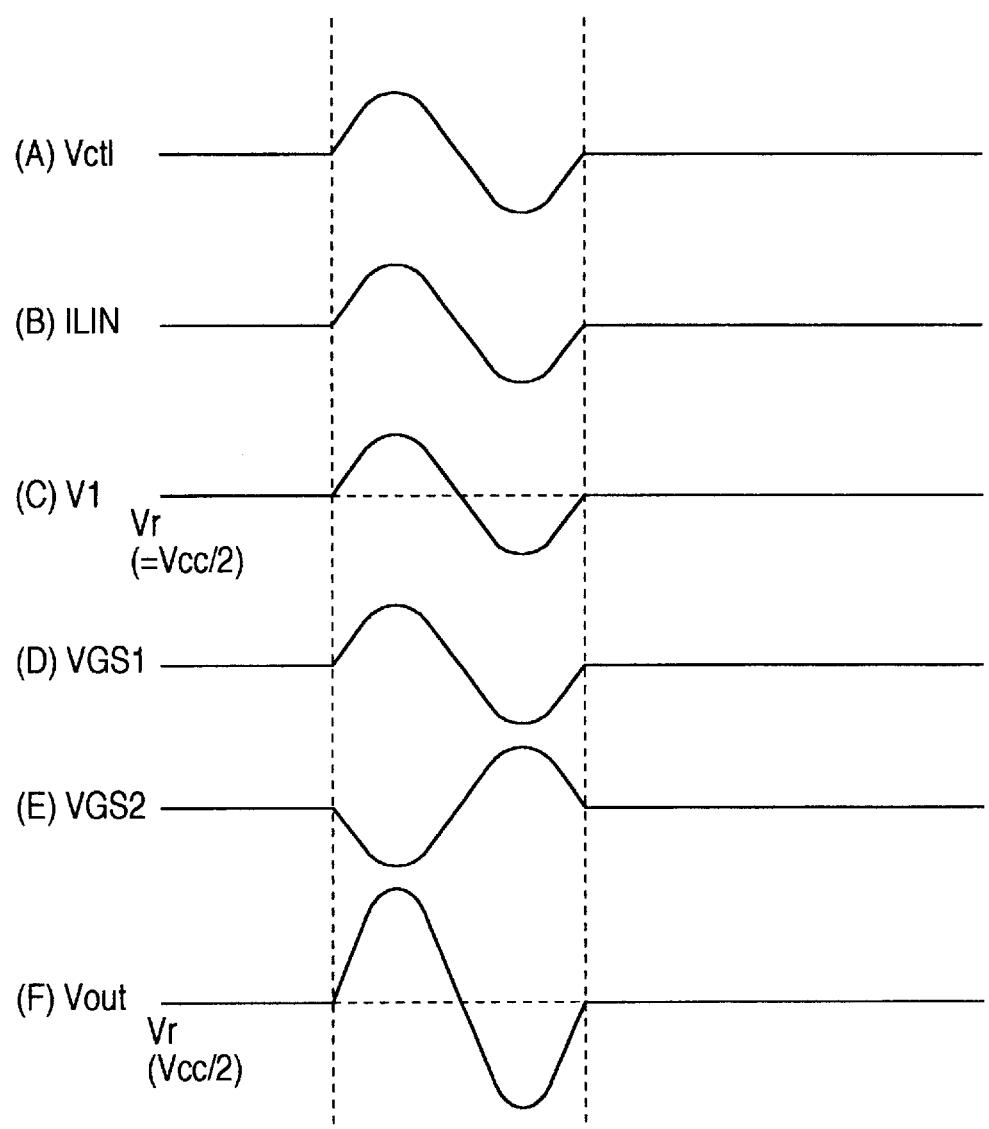
FIG. 7 is a timing chart for indicating changes in the respective signals in the linear drive mode of the output amplifier shown in FIG. 4.

When the switch SW1 is turned ON (switch SW2 is turned OFF), a relative small output current ILIN of the initial-stage amplifier 31 is conducted to the node "n0", and is inputted into the base of the transistor Q1. This base input current ILIN controls the collector current of the transistor Q1. Since the collector of this transistor Q1 is connected to the constant current source I1, the collector voltage V1 thereof is changed in a linear manner in response to a change in the input current ILIN, as indicated in FIG. 7. In other words, the transistor Q1 linear-amplifies the output current ILIN (namely, relatively small signal) of the initial stage amplifier 31 to output this amplified current signal as a voltage signal. In FIG. 7, symbol (A) indicates the control voltage Vctl outputted from the control amplifier 2; symbol (B) shows an output current (sink current) ILIN of the initial-stage amplifier 31, namely, the base input current ILIN of the transistor Q1; and symbol (C) represents a collector output voltage V1 of this transistor Q1.

Figure 8:
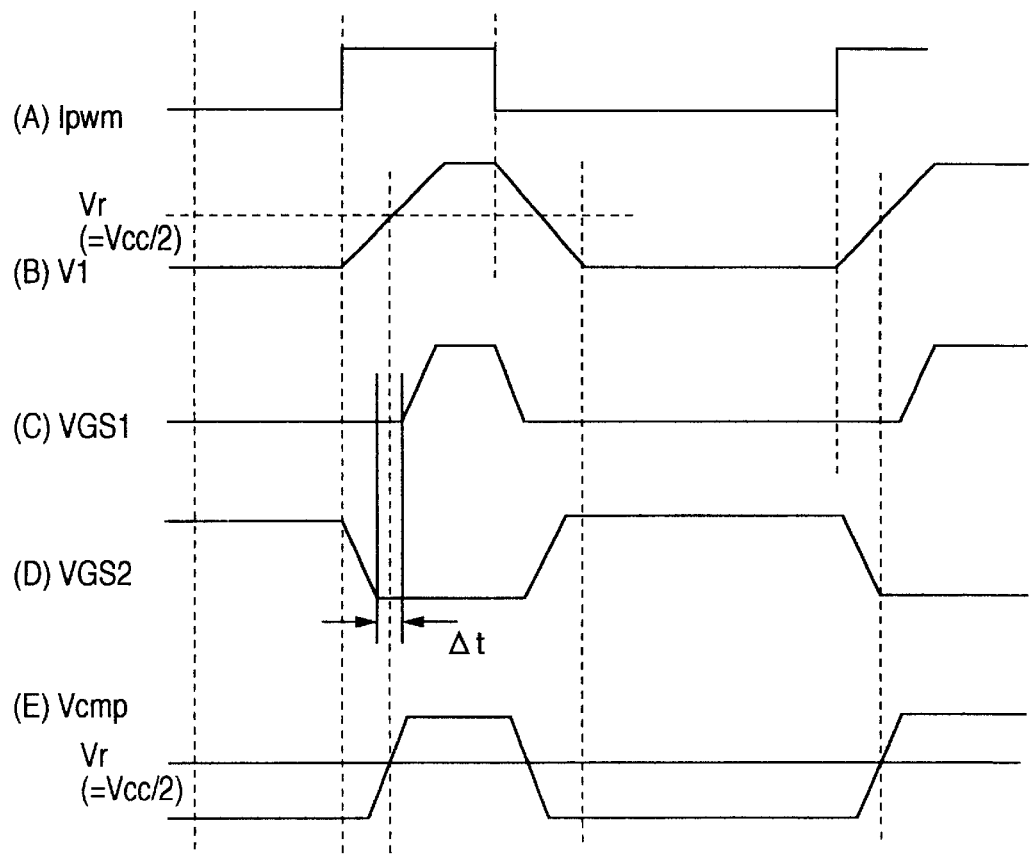
FIG. 8 is a timing chart for representing a change in the respective signals in the pulse drive mode of the output amplifier shown in FIG. 4.

On the other hand, when the switch SW2 is turned ON (switch SW1 is turned OFF), a relatively large current IPWM is entered from the PWM comparator 2 into the node "n0." Since a transition change of this current IPWM is considerably large, as compared with that of the output current ILIN of the initial-stage amplifier 31, this transition change is controlled by way of the capacitor C1 connected between the collector and the base of the transistor Q1. In other words, a major portion of this current ILIN is consumed so as to charge the capacitor C1, so that the base voltage of the transistor Q1 is gradually increased while the charging operation of the capacitor C1 is carried out. As a consequence, as indicated in FIG. 8, the voltage V1 appeared at the collector of the transistor Q1 is increased with a substantially constant inclination until this collector output voltage V1 is reached to the power supply voltage Vcc. Then, this collector voltage V1 of the transistor Q1 is entered to a non-inverting input terminal (+) of a differential amplifier 32.

The differential amplifier 32 corresponds to such an amplifier having a differential voltage input terminal (both non-inverting input terminal and inverting input terminal), and a two-phase current output terminal (both positive phase and negative phase). The characteristic of this differential amplifier 32 is set in such a manner that the output of this differential amplifier 32 is changed in a substantially linear manner in response to a change in the collector voltage V1 of the transistor Q1. In other words, this differential amplifier 32 is constituted so as to be operable in the linear mode. The voltage Vout of the output terminal of this amplifier circuit, namely either the drive voltage "Vcmp" of the coil or the drive voltage "Vcmn" of the coil is fed back via the resistor R5 to the inverting input terminal (−) of this differential amplifier 32. In an entire amplifier circuit containing this differential amplifier 32, amplifiers 33/34 connected to the post stage of the differential amplifier 32, and output transistors M1/M2, constants of circuit elements which constitute this entire amplifier circuit are set in such a manner that the collector voltage V1 corresponding to an input voltage is amplified by a high gain to output such a drive voltage Vcmp which is changed in response to the change of this collector voltage V1.

As a result, in such a pulse drive mode that the switch SW2 is turned ON to enter the current Ipwm derived from the comparator 2 into the node n0, when the output current Ipwm of the comparator 2 is set to a certain current value in response to the slew rate control signal SR, the output voltage Vout of this amplifier circuit may also be changed with an inclination in correspondence with this slew rate.

Next, a description will now be made of such a circuit portion containing buffer amplifiers 33 and 34, which are provided between the above-explained differential amplifiers 32 and the output transistors M1 and M2 as indicated in FIG. 6.

As indicated in FIG. 6, the positive phase output(+) of the differential amplifier 32 is inputted into the non-inverting input terminal of the buffer amplifier 33. An output voltage of this buffer amplifier 33 is applied to a gate of the output transistor M1. Since the output voltage of the buffer amplifier 33 is fed back to the own inverting input terminal, this buffer amplifier 33 may be operated as a voltage follower. The reason why such a buffer amplifier 33 is employed is given as follows: That is, since the size of the output transistor M1 is large and the gate capacitance thereof is also large, this output transistor M1 may be short of a drive capability in order that this output transistor M1 is directly driven by the output of the differential amplifier 32, while maintaining a desirable characteristic.

Also, in this embodiment, both a resistor R1 and an MOS transistor MS are series-connected between the positive phase-sided output terminal of the differential amplifier 32 and the output terminal OUT to which the coil of the voice coil motor is connected, namely between the input terminal of the buffer amplifier 33 and the output terminal OUT. In this case, a source side of the MOS transistor MS is connected to this output terminal OUT, a drain side thereof is connected via the resistor R1 to the input of the buffer amplifier 33, and also a gate thereof is connected to the input of the buffer amplifier 33.

Since the buffer amplifier 33 is operated as the voltage follower, the voltage applied to the gate of the MOS transistor MS becomes equal to the voltage applied to the output transistor M1. As a result, both the MOS transistors M1 and MS constitute a current mirror circuit. As a consequence, assuming now that a size ratio of the MOS transistor M1 to the MOS transistor MS is selected to be "N", the output transistor M1 is driven in such a manner that this output transistor M1 may supply a drain current N times larger than a drain current of the output transistor Ms.

Similarly, the negative phase output(−) of the differential amplifier 32 is inputted into the non-inverting input terminal of the buffer amplifier 34. An output voltage of this buffer amplifier 34 is applied to a gate of the output transistor M2. Since the output voltage of the buffer amplifier 34 is fed back to the own inverting input terminal, this buffer amplifier 34 may be operated as a voltage follower. Also, in this case, both a resistor R2 and an MOS transistor M6 are series-connected between the input terminal of the differential amplifier 34 and the output terminal OUT. In this case, a source side of the MOS transistor M6 is connected to this output terminal OUT, a drain side thereof is connected via the resistor R2 to the input of the buffer amplifier 34, and also a gate thereof is connected to the input of the buffer amplifier 34.

In this case, the voltage applied to the gate of the MOS transistor M6 becomes equal to the voltage applied to the output transistor M2. Similar to the above case, both the MOS transistors M2 and M6 constitute a current mirror circuit. As a consequence, assuming now that a size ratio of the MOS transistor M2 to the MOS transistor M6 is selected to be "N", the output transistor M2 is driven in such a manner that this output transistor M2 may supply a drain current N time larger than a drain current of the output transistor M6.

It should be understood that both the resistors R1 and R2 series-connected to the transistors M5 and M6 correspond to such an element having no such a specific meaning in the linear drive mode in which is relatively small current ILIN supplied from the amplifier 31 is entered. In the pulse drive mode, the large current Ipwm is entered from the comparator 2, so that a large current may flow through the transistors MS and M6. Then, after the input current exceeds a certain value, the voltage between the gates and the sources of the transistors MS and M6 is rapidly increased.

As a result, as indicated in (C) and (D) of FIG. 8, such a control operation is carried out in such a manner that voltages Vgs1 and Vgs2 between the gates and the sources of the output transistors M1 and M2 are sharply changed, as compared with the change in the input voltage V1 (see FIG. 8(B)) of the amplifier 32.

Also, in the amplifier circuit of FIG. 6, as shown in FIG. 8(C) and FIG. 8(D), this circuit is designed in such a manner that a falling edge of the gate-to-source voltage Vgs2 of the output transistor M2 is commenced earlier than a rising edge of the gate-to-source voltage Vgs1 of the output transistor M1 by employing such a manner capable of properly setting, for example, both the amplitude level of the positive phase-sided output and the amplitude level of the negative phase-sided output of the amplifier 32.

As a consequence, both the output transistors M1 and M2 are turned ON at the same time in order that a pass-through current does not flow therethrough, and thus, an increase of power consumption thereof can be suppressed. Similarly, this circuit may be designed in such a manner that a rising edge of the gate-to-source voltage Vgs2 of the output transistor M2 is commenced earlier than a falling edge of the gate-to-source voltage Vgs1 of the output transistor M1.

As apparent from the foregoing description, the output amplifier 3(4) is operated in a relatively high slew rate in the pulse drive mode during which the output amplifier 3(4) is operated with the large amplitude. On the other hand, the output amplifier 3(4) is operated in a relatively low slew rate in the linear drive mode during which the output amplifier 3(4) is operated with the small amplitude.

Furthermore, in the amplifier circuit of the embodiment shown in FIG. 6, both a switch SW3 and a constant current source I2 are series-connected to both the above-described resistor R1 and transistor MS, whereas both a switch SW4 and a constant current source I3 are series-connected to both the resistor R2 and the transistor M6. Then, the switch SW3 and the switch SW4 are controlled in such a manner that both the switches SW3 and SW4 are turned ON/OFF in response to, for example, a mode switching signal PWM/LIN, and cause the constant currents of the constant current sources I2 and I3 to flow through the resistors R3 and R4 during the idling operation in which the magnetic head is held under stop condition in the linear drive mode. It should be noted that the current values of these current sources I2 and I3 may be selected to be relatively small values.

Figure 9:
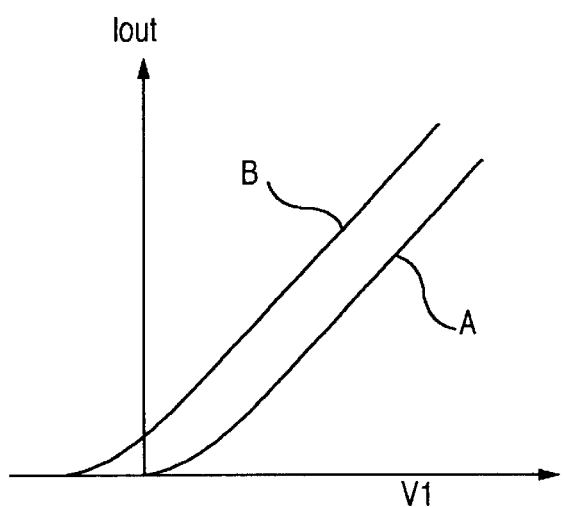
FIG. 9 is a graphic representation for graphically indicating an amplifier input/output characteristic representative of both an input voltage/output current characteristic "A" of an amplifier 32 when an idling current does not flow through an output transistor, and another input voltage/output current characteristic when an idling circuit flows through the output transistor.

The characteristic of the output current Iout of the amplifier 3(4) with respect to the input voltage V1 is not perfectly linear, but a change thereof is small in the vicinity of "0(zero)." FIG. 9 indicates an input voltage-to-output current characteristic "A" of the amplifier 3(4) when an idling current does not flow through the transistors, and also another input voltage-to-output current characteristic "B" of the amplifier 3(4) when the idling current flows through the transistors. If the input/output current characteristic "A" when no idling current flows is set, then the amplifier 3(4) is operated in the B-class. If the input voltage/output current characteristic B when the idling current flows is set, then the amplifier 3(4) is operated in the AB-class.

In this embodiment, in order to improve the linear characteristic of the amplifier 3(4) in the vicinity of "0(zero)", since the constant currents of the constant current sources I2 and I3 are supplied to the resistors R3 and R4 during the idling operation, the voice coil motor can quickly respond when the magnetic head is not moved. In other words, in the linear drive mode, the amplifier 3(4) is operated in the AB-class due to the above-explained characteristic B. As a result, while the switching nose of the output circuit can be avoided, the drive current of the voice coil motor can be controlled in high precision and under highly stable condition. As a result, the tracking motion during which the head position is precisely controlled can also be carried out in high precision and under high stable condition.

In the pulse drive mode, since the input voltage V1 is considerably larger than that of the linear drive mode and also the amplifier is not operated in the vicinity of "0(zero)", such a control operation is carried out. That is, the switches SW3 and SW4 are turned OFF in order that the constant currents of the constant current sources I2 and I3 do not flow toward the resistors R3 and R4. In other words, the amplifier 3(4) is operated in the B-class due to the above-explained characteristic "A" in the pulse drive mode. As a consequence, such a pass-through current (penetration current) with a large amplitude and in the high slew rate can be avoided.

Furthermore, in the amplifier circuit of FIG. 6, the current values of the above-explained current sources I2 and I3 can be adjusted. In addition to this adjustable current function, both a comparator 35 for detecting a level of the output voltage Vout, and a register 36 for holding a judgement result of this comparator 35 are provided. The current values of the above-explained current sources I2 and I3 are variably set (program) by the register 36. The content of this register 36 is variably set based upon the judgement result of the comparator 35. As a consequence, the amplifier circuit is arranged in such a manner that the current values of the above-described current sources I2 and I3 are adjusted based upon the comparison output of the comparator 35. This comparator 35 is operated only when the power supply of this system is turned ON. Thus, in the normal operation during which the magnetic head performs the seek operation, or the tracking operation, the comparator 35 is not operated, or the output of this comparator 35 is invalid.

In this case, a description will now be made of a reason why the above-described comparator 35 is provided, and operations of this comparator 35. Since the relatively large currents flow through the output transistors M1 and M2 which drive the coil of the voice coil motor, such electronic elements having larger sizes than the sizes of the transistors M5 and M6 are employed. As a consequence, the ratio of the element sizes of the transistors M1 and M2 to the element sizes of the transistors M5 and M6 contains a large manufacturing fluctuation. There are certain possibilities that externally-connectable elements are used to the output transistors M1 and M2. In such a case that such an externally-connectable element is employed, a difference between a characteristic of this externally-connectable element and a characteristic of an internal element (transistor M5, M6) which drives this externally-connectable element becomes further large.

As a result, in such a case that the idling current is supplied to the coil so as to improve the linear characteristic of the output current in the linear drive mode, the following possibility may be made. That is, the fluctuation of this idling current is increased due to the difference in the characteristics of the elements, so that the power consumption is unexpectedly increased. To the contrary, the idling current is excessively reduced, so that the amplifier is operated in the B-class mode, and therefore, a so-called "switching noise" may be produced in the vicinity of the zero cross point where the polarity (source and sink) of the output current Iout is switched, namely in the vicinity of the output "0."Under such a circumstance, in accordance with this embodiment, the above-explained idling current may be set in the optimum manner in accordance with the below-mentioned method.

Figure 10:
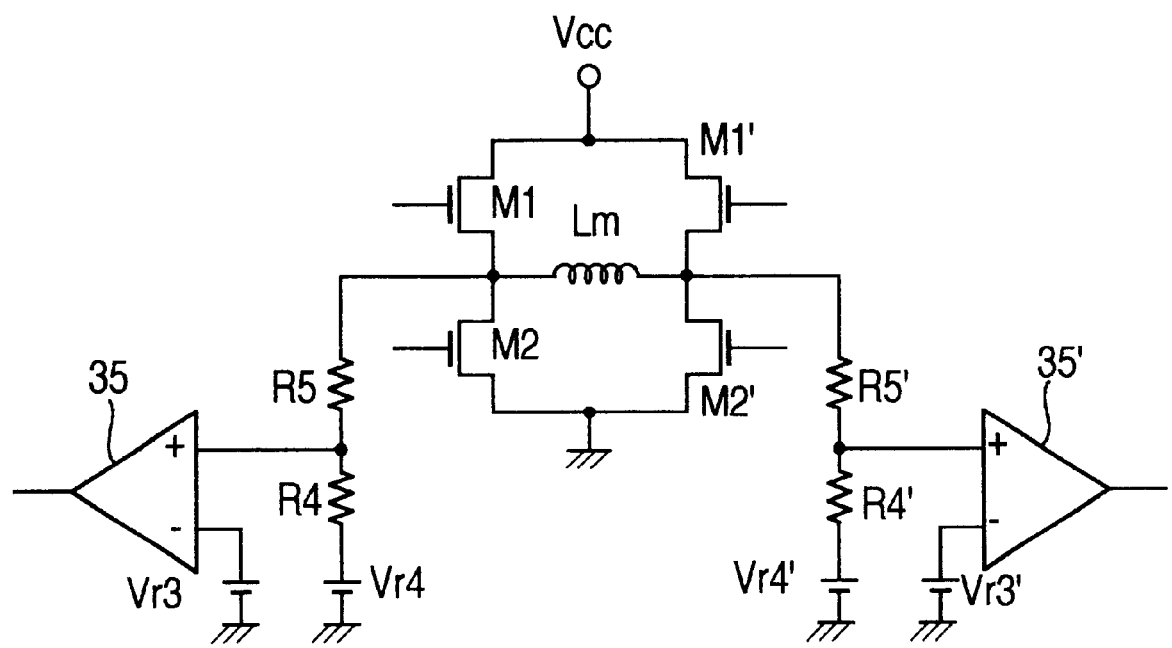
FIG. 10 is a circuit diagram for explaining operation of a comparator for detecting an ON-resistance value of the output transistor employed in the voice coil motor drive circuit of an embodiment.

In other words, the above-described optimal setting operation of the idling current can be carried out in such a way that ON-resistance values of the output transistors M1 and M2 are previously detected, and then, the idling current is adjusted in response to the detected ON-resistance values of the output transistors M1 and M2. That is, the optimal setting operation of the idling current may be performed by variably setting the circuit parameters. Concretely speaking, either when the power supply is turned ON or at the final stage of the manufacturing stages of the system, and one of the output transistors M1, M2 of the amplifier 3 and the output transistors M1', M2' of the amplifier 4 is brought into the ON state, and the remaining transistors thereof are brought into the OFF state. Under this condition, a resistance value of such an output transistor which is turned ON while the constant currents of the constant current sources 12 and 13 for the idling current flow therethrough is detected by employing either the comparator 35 or the comparator 35' (see FIG. 10). For instance, considering now such a case that the output transistor M1 is turned ON and the output transistors M2, M1', M2' are turned OFF so as to detect the ON resistance value of this output transistor M1, both an idling current IIDLE supplied from the constant current source I2 and a drain current Id of the output transistor M1 will flow through the resistors R5 and R4 into a reference power supply Vr4. As a consequence, such a voltage defined in accordance with a ratio of the summed current (IIDLE+Id) to the resistors R4 and R5 is applied to the non-inverting input terminal of the comparator 35. Also, since the idling current supplied from the constant current source I2 is previously grasped, if both the ratio of the resistor R4 to the resistor R5, and also the voltage Vr3 applied to the inverting input terminal of the comparator 35 are set to proper values, such a fact can be recognized as to whether or not the drain current Id of the output transistor M1 is larger than a desirable value.

As a result, while the output of the comparator 35 obtained at this time is stored in the register 36, derived from the constant current source I2 is adjusted in response to the value of this register 36 during the normal operation, so that such a current flowing through the output transistor M1 during the idling operation can be adjusted to a desirable current value. Alternatively, while either a plurality of comparators having different comparison voltages (Vr3) or an A/D converting circuit is employed instead of the comparator 35, since the idling current Id of the output transistor M1 is judged based upon several levels, the magnitude of the idling current supplied from the constant current source I2 may be adjusted in a plurality stages.

After the idling current adjustment of the output transistor M1 has been completed, under such a condition that the output transistor M2 is turned ON and also the output transistors M1, M1', M2' are turned OFF, a resistance value of such an output transistor which is turned ON by causing the idling current of the constant current source I3 to flow through the output transistor M6 is subsequently detected by the comparator 35. At this time, while the drain current of the output transistor M2 is supplied from the reference power supply Vr4, such a voltage defined by a ratio of the drain current Id of the output transistor M2 to the resistors R4 and R5 is applied to the non-inverting input terminal of the comparator 35. Also, since the idling current supplied from the constant current source I3 is previously grasped, if both the ratio of the resistor R4 to the resistor R5, and also the voltage Vr3 applied to the inverting input terminal of the comparator 35 are set to proper values, such a fact can be recognized as to whether or not the drain current Id of the output transistor M2 is larger than a desirable value. Then, based upon this detection result, the idling current derived from the constant current source I3 is adjusted.

Furthermore, after the adjusting operation of the idling current flowing through the output transistors M1 and M2 has been accomplished, while either the output transistor M1' or the output transistor M2' provided on the side of the output amplifier 4 is turned ON under such a condition that both the output transistors M1 and M2 are turned OFF, a constant current is supplied from a constant current source (corresponding to I2 and I3) for an idling operation so as to detect an ON-resistance value of either the output transistor M1' or the output transistor M2' by the comparator 35', and thus, the current value of the idling constant current source may be adjusted.

It should be noted in this embodiment that while the register 36 used for the idling current adjusting operation is employed, the ON-resistance value of the output transistor is detected when the power supply is turned ON, and the judgement result of the comparator 35 is directly held in the register 36. Alternatively, the judgement result of the comparator 35 is supplied to the controller 260, and then, this controller 260 may produce idling current adjustment information to set this idling current adjustment information into the register 36.

As previously described, in the magnetic disk storage apparatus according to the present invention, the voice coil motor used to move the magnetic head in either the seek operation or the tracking operation can be driven in response to the magnitude of this drive amount by switching the pulse drive mode, or the linear drive mode, and furthermore, both the pulse drive operation and the linear drive operation are carried out by employing the same output amplifier. During the pulse drive mode, since the voice coil motor is driven with the large amplitude and the high slew rate, the seek time can be shortened, so that the access operation of the magnetic head can be carried out in the high speed. During the linear drive mode, while both the generation of the EMI noise and the heat generation which may probably induce the read/write error are suppressed to the minimum values, the magnetic head positioning control operation can be carried out in the high precision during the tracking operation. As explained above, in accordance with the present invention, both the pulse drive operation and the linear drive operation can be carried out under the respective optimum conditions thereof while the same output amplifier is commonly used.

While the concrete examples of the present invention have been described based upon the embodiment modes invented by the Inventors of the present invention, the present invention is not limited only the above-explained embodiment modes, but may be apparently changed, or modified without departing from the gist of the present invention. For instance, in the above-explained embodiment, both the comparator 35 for detecting the ON-resistance value of the output transistor and also the register 36 for holding this judgement result are employed. Alternatively, a programmable element may be employed instead of both the comparator 35 and the register 36 in order to adjust the current values of the constant current sources I2 and I3. In this alternative case, both the ON-resistance detecting operation of the output transistor and the current adjustment may be carried out not in such a condition that the power supply is turned ON, but in the final stage of the manufacturing steps.

Also, while either the comparator 35 or the A/D converting circuit is not provided, the ON-resistance value of the output transistor is previously detected to determine the current adjustment amount, and when the power supply is turned ON, idling setting information used to instruct the magnitude of the idling current is supplied from the controller 260 to the motor drive circuit 110, so that this idling setting information may be set to the register 36. Furthermore, in such an arrangement that the idling setting value is supplied from the controller 260, such a register into which the idling current adjustment information is stored may be provided in the serial port 111. Then, the information for designating the drive mode and the slew rate designation information for designating the slew rate of the output waveform may be set into this register in addition to the adjustment information of the idling current.

In the foregoing description, the inventive ideas invented by the Inventors of the present invention have been mainly applied to the magnetic disk storage apparatus, while the hard disks are employed as the storage media corresponding to the utilization field of the technical background of the present invention. However, the present invention is not limited to the above-described magnetic disk storage apparatus, but may be applied to such a magnetic disk storage apparatus, while a flexible disks are used as storage media.

Now, various effects which can be achieved by the typical embodiment of the present invention among the disclosed various embodiments will be simply explained as follows:

That is, in the magnetic disk apparatus, the voice coil motor used to move the magnetic head in either the seek operation or the tracking operation can be driven in response to the magnitude of this drive amount by switching the pulse drive mode, or the linear drive mode, and furthermore, both the pulse drive operation and the linear drive operation are carried out by employing the same output amplifier under optimum drive conditions.

Also, while the construction of this magnetic disk storage apparatus is not made complex and in the large scale, the seek time is shorten, so that the access operation of the magnetic head can be carried out in high speeds. On the other hand, during the linear drive mode, while both the generation of the EMI noise and the heat generation which may probably induce the read/write error are suppressed to the minimum values, the magnetic head positioning control operation can be carried out in the high precision during the tracking operation.

What is claimed is:

1. A magnetic disk storage apparatus comprising:
    a magnetic head for reading information with respect to a storage track on a magnetic storage disk to be rotatably driven;
    a voice coil motor for moving said magnetic head on said magnetic storage disk; and
    magnetic head drive control means for executing a positioning control operation of said magnetic head by feedback-controlling a drive current of said voice coil motor while monitoring a read condition of said magnetic head; wherein:
        said magnetic head drive control means contains:
            a linear drive mode under which said voice coil motor is driven in a linear control manner; and a pulse drive mode under which said voice coil motor is driven in a pulse width control manner;

both said linear drive mode and said pulse drive mode are carried out by employing a commonly-used output amplifier;

said output amplifier includes an output circuit equipped with both a push-driving output transistor and a pull-driving output transistor; and in said output circuit, an AB-class operation is set during the linear drive mode, whereas a B-class operation is set during the pulse drive mode.

2. A magnetic disk storage apparatus as claimed in claim 1 wherein:

both the AB-class operation and the B-class operation are switched to be set in the output amplifier by variably setting a circuit parameter used to set an idling current of said output transistor in such a manner that said circuit parameter set to the linear drive mode is different to the circuit parameter set to the pulse drive mode.

3. A magnetic disk storage apparatus as claimed in claim 1 wherein:

said magnetic disk storage apparatus is further comprised of a current source capable of supplying an idling current to said output transistors; and an idling current value of said idling current source is adjustable.

4. A magnetic disk storage apparatus as claimed in claim 3 wherein:

said magnetic head storage apparatus is further comprised of:

setting means for setting adjustment information of the current value of said idling current source.

5. A magnetic disk storage apparatus as claimed in claim 4 wherein:

said magnetic disk storage apparatus is further comprised of:

output voltage detecting means capable of detecting a voltage appeared at an output of said output circuit; and said output voltage detecting means turns OFF one of said push-driving output transistor and said pull-driving output transistor; is capable of detecting the voltage of said output of the output circuit under such a condition that an idling current flows through the other of said push-drive output transistor and said pull-drive output transistor; and sets the adjustment information to said setting means based upon said voltage detect result.

6. A magnetic disk storage apparatus as claimed in claim 5 wherein:

the detection output of said output voltage detecting circuit is supplied to a control means for applying a drive current command value to said magnetic head drive control means; and adjustment information of said idling current source, which is determined by said control means, is transmitted to be set into said setting means.

7. A magnetic disk storage apparatus as claimed in claim 1 wherein:

said output amplifier is set in a low slew rate during the linear drive mode.

8. A magnetic disk storage apparatus as claimed in claim 1 wherein:

said output amplifier is set in a high slew rate during the pulse drive mode.

9. A magnetic disk storage apparatus comprising:

a magnetic head for reading information with respect to a storage track on a magnetic storage disk to be rotatably driven;

a voice coil motor for moving said magnetic head on said magnetic storage disk; and magnetic head drive control means for executing a positioning control operation of said magnetic head by feedback-controlling a drive current of said voice coil motor while monitoring a read condition of said magnetic head; wherein:

said magnetic head drive control means contains:

a linear drive mode under which said voice coil motor is driven in a linear control manner; and a pulse drive mode under which said voice coil motor is driven in a pulse width control manner;

when a drive current of said voice coil motor is equal to a first value, said magnetic head drive control means executes said linear drive mode; and when a drive current of said voice coil motor is larger than said first value, said magnetic head drive control means executes said pulse drive mode;

both said linear drive mode and said pulse drive mode are carried out by employing a commonly-used output amplifier;

said output amplifier includes an output circuit equipped with both a push-driving output transistor and a pull-driving output transistor; and said output amplifier is set to a low slew rate in the linear drive mode.

10. A magnetic disk storage apparatus as claimed in claim 9 wherein:

said output amplifier is set in a high slew rate during the pulse drive mode.

11. A magnetic disk storage apparatus as claimed in claim 9 wherein:

in said output circuit, an AB-class operation is set during the linear drive mode, whereas a B-class operation is set during the pulse drive mode.

* * * * *